(12) United States Patent
Charleston (10) Patent No.: US 9,907,295 B2
(45) Date of Patent: Mar. 6, 2018

(54) PIVOTAL COVER ASSEMBLY FOR A POULTRY DRINKER

(71) Applicant: Don Charleston, Maxwell, IA (US)

(72) Inventor: Don Charleston, Maxwell, IA (US)

(*) Notice: Subject to any disclaimer, the term of this patent is extended or adjusted under 35 U.S.C. 154(b) by 0 days.

(21) Appl. No.: 15/416,421

(22) Filed: Jan. 26, 2017

(65) Prior Publication Data

US 2017/0135321 A1    May 18, 2017

Related U.S. Application Data

(63) Continuation-in-part of application No. 14/244,333, filed on Apr. 3, 2014, now Pat. No. 9,565,832.

(60) Provisional application No. 61/807,863, filed on Apr. 3, 2013.

(51) Int. Cl.
| | | |
|---|---|---|
| A01K 39/00 | (2006.01) | |
| A01K 39/026 | (2006.01) | |
| A01K 45/00 | (2006.01) | |
| A01K 39/01 | (2006.01) | |

(52) U.S. Cl.
CPC ........ *A01K 39/026* (2013.01); *A01K 39/0113* (2013.01); *A01K 45/00* (2013.01)

(58) Field of Classification Search
CPC .... A01K 39/0113; A01K 39/00; A01K 39/01; A01K 39/02; A01K 39/04
USPC ................. 119/74, 52.3, 52.4, 57.9
See application file for complete search history.

(56) References Cited

U.S. PATENT DOCUMENTS

| | | | | |
|---|---|---|---|---|
| 1,154,073 A | * | 9/1915 | Stocking .............. | A01K 39/012 119/52.4 |
| 1,404,251 A | * | 1/1922 | Westenberger ...... | A01K 39/012 119/52.4 |
| 1,916,790 A | * | 7/1933 | Guenser ................. | A01K 39/02 119/61.3 |
| 3,090,354 A | * | 5/1963 | Merritt ............... | A01K 39/0113 119/52.3 |
| 4,348,988 A | | 9/1982 | Lawson | |
| 5,097,797 A | | 3/1992 | Van Zee et al. | |
| 5,361,723 A | * | 11/1994 | Burleigh ............ | A01K 39/0113 119/52.3 |
| 5,718,187 A | * | 2/1998 | Pollock .............. | A01K 39/0125 119/52.4 |
| 5,829,386 A | | 11/1998 | Wenstrand | |
| 5,927,232 A | | 7/1999 | Pollock | |
| 6,918,353 B1 | * | 7/2005 | Coroneos ........... | A01K 39/0113 119/52.3 |
| 7,409,922 B1 | * | 8/2008 | Baynard ............. | A01K 39/012 119/52.3 |
| 2014/0311413 A1 | * | 10/2014 | Hoysak .............. | A01K 39/0113 119/61.1 |

* cited by examiner

*Primary Examiner* — David Parsley
*Assistant Examiner* — Danielle Clerkley
(74) *Attorney, Agent, or Firm* — Zarley Law Firm, P.L.C.

(57) ABSTRACT

The present invention relates to a cover assembly for a poultry feeder including a pivotal cover member that engages a peak of the cover assembly. The peak is formed by an elongated portion of a plurality of support members that are connected to one or more support rings. Extending upwardly from the peak is an elongated member that also engages the pivotal cover member.

19 Claims, 9 Drawing Sheets

PIVOTAL COVER ASSEMBLY FOR A POULTRY DRINKER

CROSS REFERENCE TO RELATED APPLICATION

This application is a continuation in part of U.S. patent application Ser. No. 14/244,333 filed Apr. 3, 2014, which claims the benefit of U.S. Provisional Application No. 61/807,863 filed on Apr. 3, 2013.

BACKGROUND OF THE INVENTION

This invention is directed to a cover for a poultry drinking device or fount and more particularly a cover for a poultry drinking device that pivots or is tiltable.

Poultry drinkers or founts are well known. Presently, birds tend to roost on the top edge of the drinkers. As a result, because a drinking pan is positioned below and extends outwardly from the top edge, birds have a tendency to leave droppings in the drinking water. Not only is this unsanitary, but as a result cleaning the drinking device is more difficult and is required more frequently. Accordingly there exists a need to address these issues.

Therefore, an objective of the present invention is to provide a cover for a drinker that discourages birds from roosting on the drinker.

A further objective is to provide a cover for a drinking device that reduces the amount of droppings deposited in the drinking water.

These and other objectives will be apparent based upon the following written description.

SUMMARY OF THE INVENTION

A pivotal cover assembly for a poultry drinker includes a sleeve that fits over the top of a drinker. Connected to the sleeve and extending upwardly from the drinker is a primary support. Pivotally connected to the primary support, in spaced relation to the drinker, is a cover member.

DETAILED DESCRIPTION OF THE PREFERRED EMBODIMENTS

Figure 1:
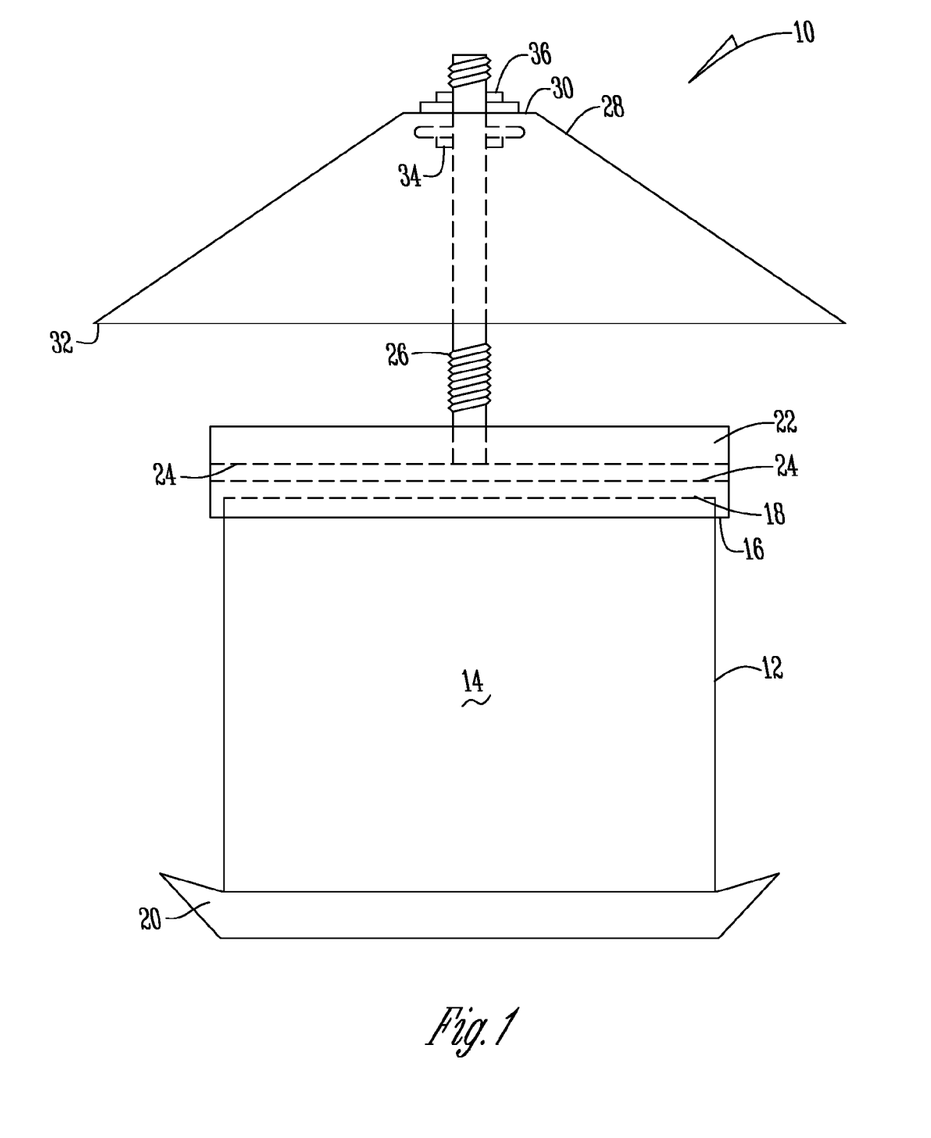
FIG. 1 is side sectional view a cover assembly and a drinker.
Figure 2:
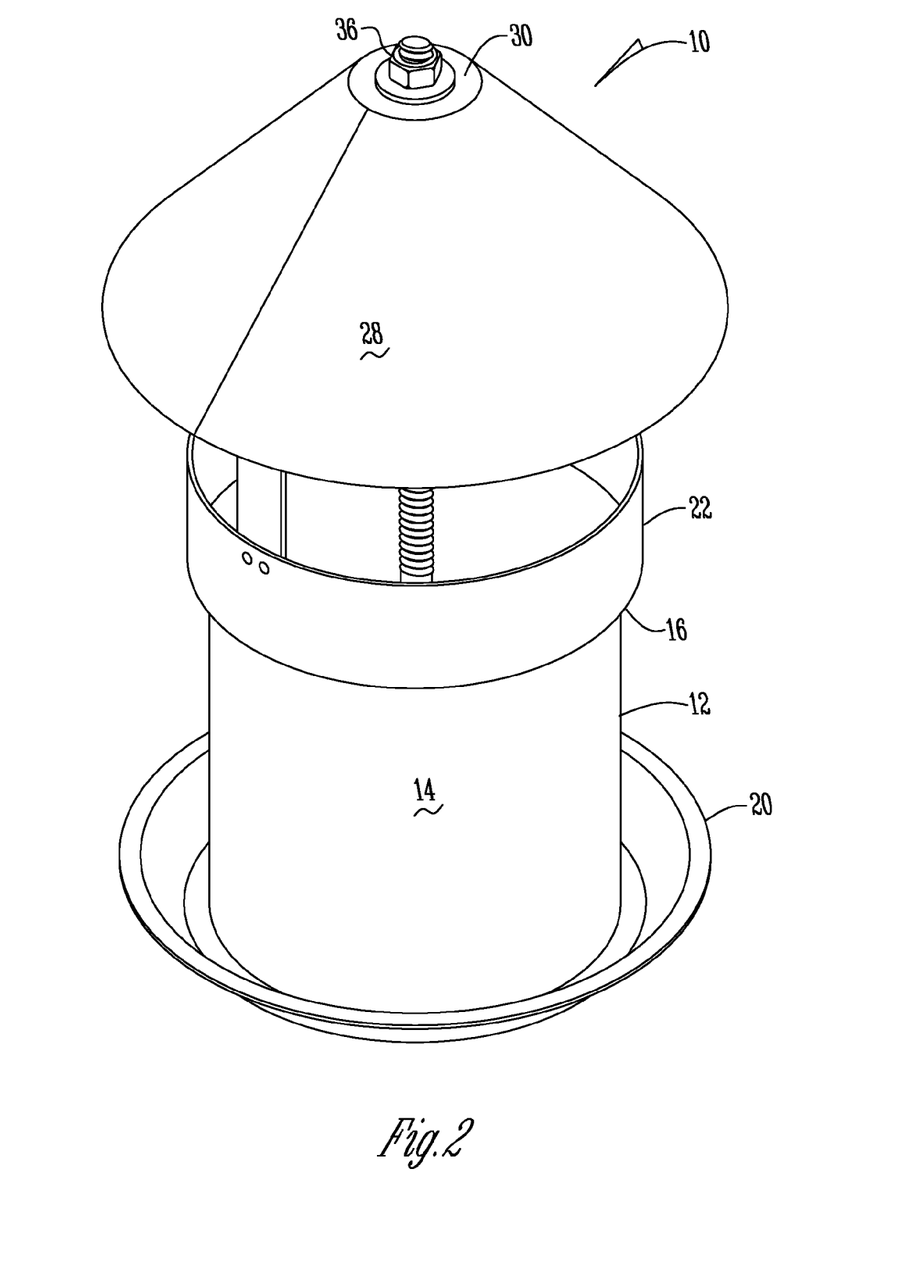
FIG. 2 is a perspective view of a cover assembly and drinker.
Figure 3:
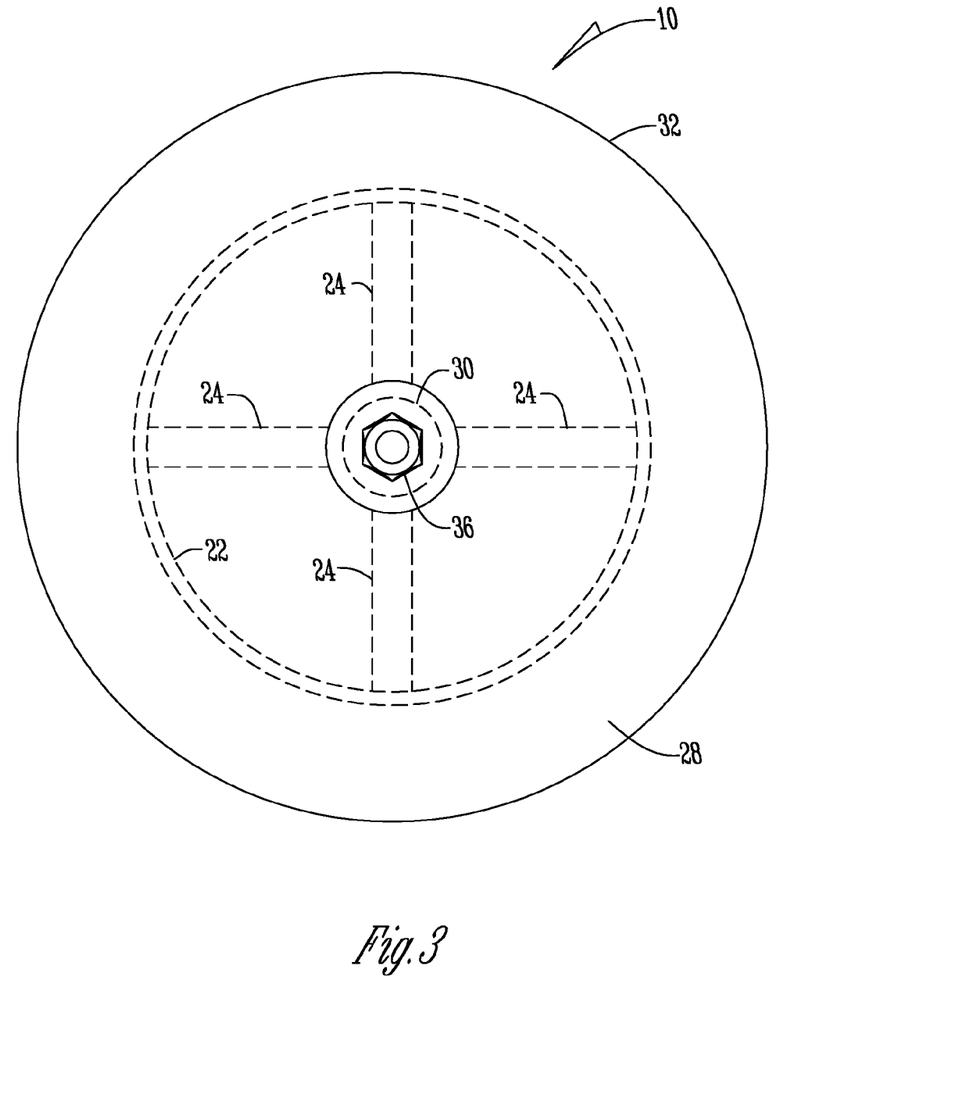
FIG. 3 is a top plan view of a cover assembly.

Referring to the Figures, the cover assembly 10 is used in relation to a poultry drinking or feeding device 12 and by example only will be described for use in relation to a poultry fount. Poultry founts 12 are of different types and design but generally have a tank 14 having a top 16 with a top edge 18, and connected to the bottom of the tank 14 is a drinking pan or trough 20 that receives water from the tank.

The cover assembly 10 has a sleeve 22 that is formed to fit snuggly around the top 16 of the tank 14. The sleeve 22 can be made to fit any size of drinker 12 or alternatively is adjustable. Connected to the sleeve 22 and extending generally radially inwardly above the top 16 of the tank 14 are a plurality of support members 24. The support members 24 are connected to a primary support member 26 that extends upwardly away from the tank in a generally vertical direction. Preferably, the primary support member is threaded.

A cover member 28 is pivotally or tiltably connected to the primary support member 26. Preferably, the cover member 28 has a central opening 30 having a diameter larger than the diameter of the primary support member 26 and either tapers downwardly from the central opening 30 to an outer edge 32. Alternatively, the cover 30 is arcuate and convex in relation to the tank 14. Preferably, the cover 30 is connected to the primary support member 26 by placing a first nut and washer 34 on the primary support member 26, inserting the primary support member 26 through the central opening 30 of the cover 28 and placing a second nut and washer 36 on the primary support member 26 above the cover 28. The nuts and washers 34 and 36 are spaced apart and have a diameter greater than the diameter of the central opening 30. The amount of pivot or tilt of the cover 28 in relation to the primary support member 26 is dependent upon the difference of their respective diameters and the spacing between nuts 34 and 36.

In operation, once assembled, when a bird lands on the cover 28 to roost the cover will tilt or pivot downward toward the tank causing the bird to slide off. Typically it only takes one try before a bird learns not to attempt to roost on the cover.

Figure 4A:
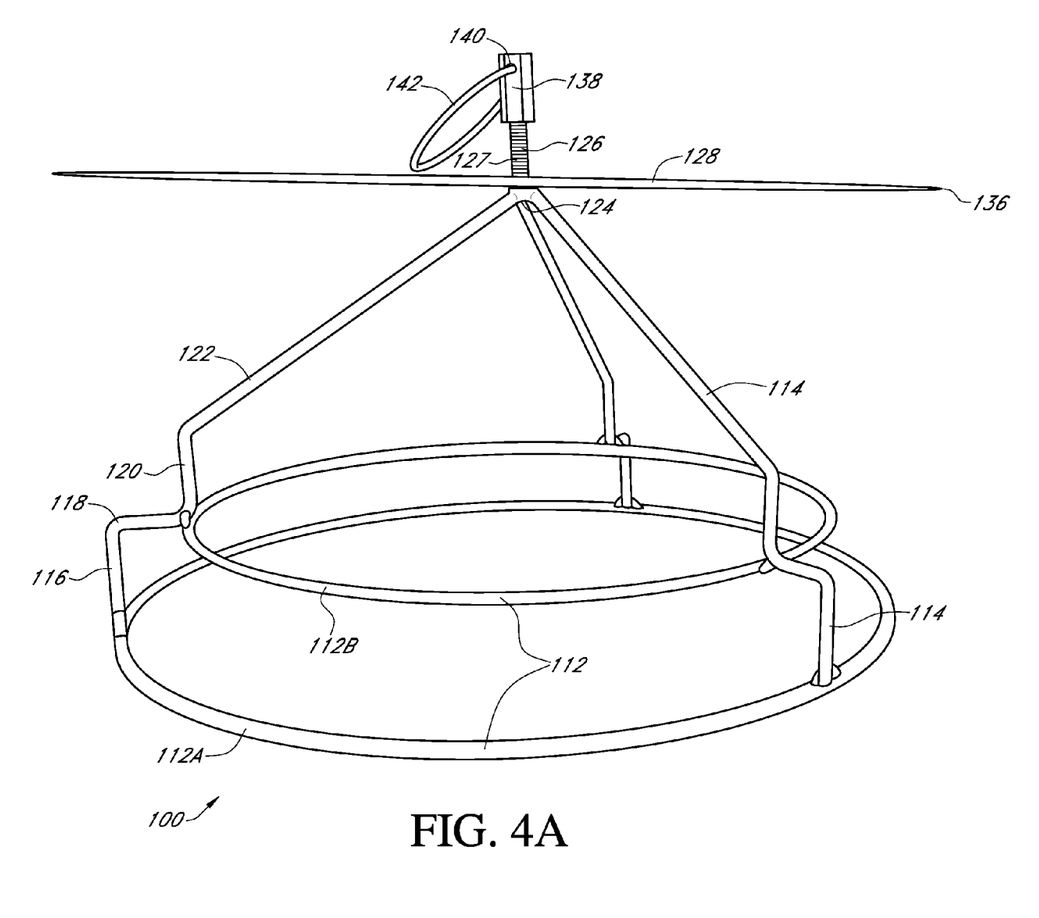
FIG. 4A is a side sectional view of a cover assembly.
Figure 4B:
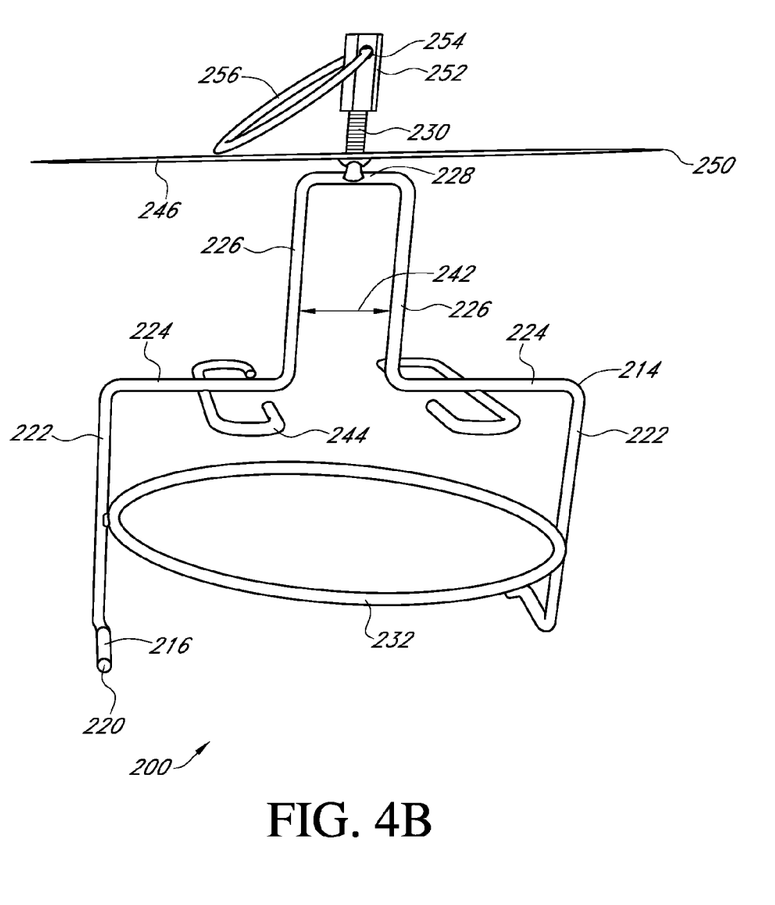
FIG. 4B is a side sectional view of a cover assembly.
Figure 5A:
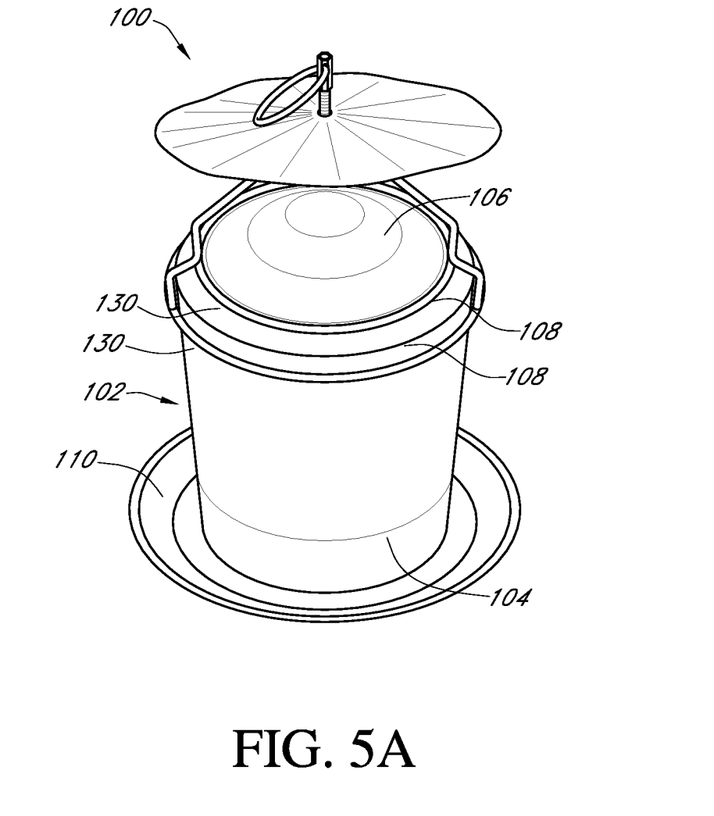
FIG. 5A is a side sectional view of a cover assembly and a drinker.
Figure 5B:
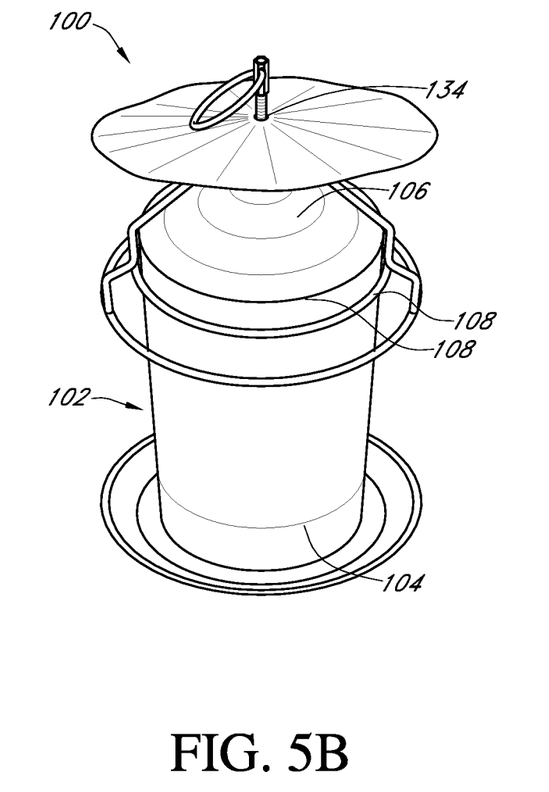
FIG. 5B is a side sectional view of a cover assembly and a drinker.

With reference to FIGS. 4 and 5, in an alternative embodiment, a cover assembly 100 is used in relation to a poultry drinking or feeding device 102 and by example only will be described for use in relation to a poultry drinker. The cover assembly 100 is welded or is a uniform body. Poultry drinkers 102 are of different types and designs but generally have a tank 104 having a top 106 with a plurality of conical portions 108, and connected to the bottom of the tank 104 is a drinking pan or trough 110 that receives water from the tank 104. In one embodiment, the tank 104 is configured to contain 2, 3, 5, or 8 gallons of fluid. In an alternative embodiment, the tank is a Harris drinker. In another alternative embodiment, the tank 104 is configured to contain 3, 5, or 6 gallons of fluid. In the alternative, the tank 104 is a Brower tank that is configured to contain 4 or 7 gallons of fluid.

The cover assembly 100 has one or more support rings 112. On one arrangement, a first support ring 112A is larger in diameter than a second support ring 112B. The support rings 112A, 112B are connected to one or more support members 114 having a first vertical portion 116, a horizontal portion 118, and a second vertical portion 120. In one embodiment, portions 116, 118, 120 are configured to resemble stairs. In another embodiment, there are at least three support members 114 evenly space around the circumference of the one or more support rings 112.

An elongated angular portion 122 extends inwardly and upwardly from the second vertical portion 120 toward a peak 124 having an elongated member 126. In one embodiment, the elongated member 126 has a threaded portion 127. The peak 124 engages a cover member 128. The cover member 128 can be flat or rippled. In one embodiment, when the tank 104 is a larger size, both support rings 112A, 112B engage a section 130 of the drinking device 102, as shown in FIG. 5A. Alternatively, as shown in FIG. 5B, when the tank 104 is a smaller size, support ring 112A engages a section of the smaller tank 104 while support ring 112B does not.

The cover member 128 is pivotally or tiltably connected to the elongated member 126. In one embodiment, the cover member 128 is pivotally or tiltably connected to the elongated member 126 at the peak 124. Preferably, the cover member 128 has a central aperture 134 having a diameter larger than the diameter of the elongated member 126 such that the elongated member 126 is received through the central aperture 134. In one embodiment, the cover member 128 tapers downwardly from the central aperture 134 to an outer edge 136 of the cover member 128. Alternatively, the cover 128 is arcuate and convex in relation to the tank 104. A nut 138 is connected to and extends upwardly from the elongated member 126. The nut 138 has at least one opening 140 that receives a ring 142.

Preferably, the cover member 128 engages the peak 124 by threading the cover member 128 over the elongated member 126 through the central aperture 134 of the cover member 128 and placing the nut 138 on the elongated member 126 above the cover member 128. The diameter of the nut 138 is greater than the diameter of the central aperture 134. The amount of pivot or tilt of the cover member 128 in relation to the elongated member 126 is dependent upon the difference of their respective diameters and the spacing between the nut 138 and the peak 124.

In operation, once assembled, the user determines the amount of tilt by twisting the ring 142 until the nut 138 is in the desired position to produce the desired amount of tilt. Once the tilt is set, when a bird lands on the cover member 128 to roost the cover member 128 will tilt or pivot downward toward the tank causing the bird to slide off. From experience, it typically only takes one try before a bird learns not to attempt to roost on the cover.

Figure 6A:
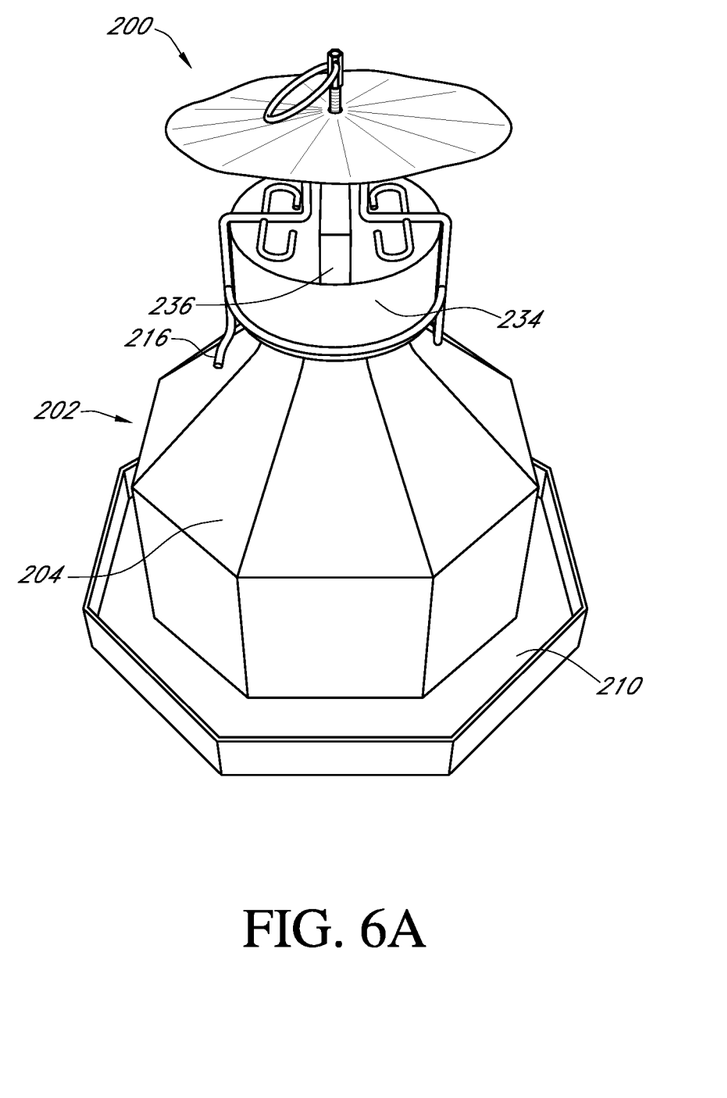
FIG. 6A is a side sectional view of a cover assembly and a drinker.
Figure 6B:
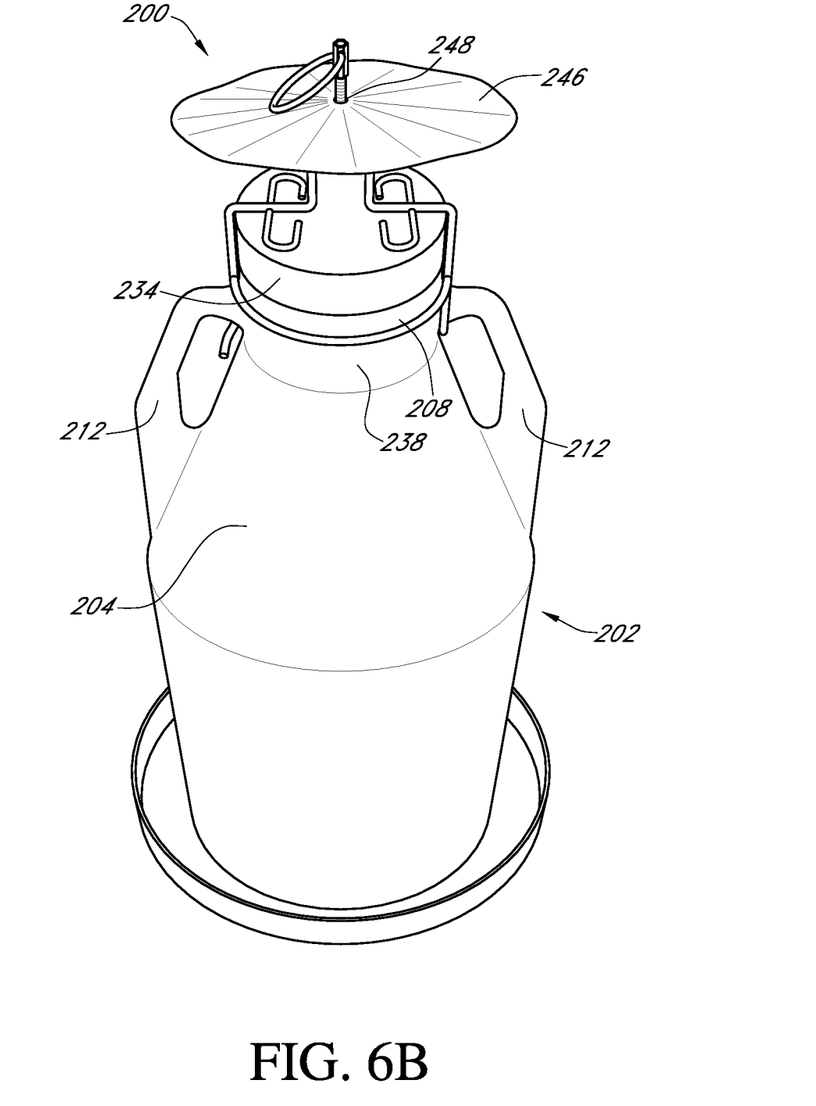
FIG. 6B is a side sectional view of a cover assembly and a drinker.

Referring to FIGS. 4B, 6A, and 6B, in an alternative embodiment, a cover assembly 200 is used in relation to a poultry drinking or feeding device 202 and by example only will be described for use in relation to a poultry drinker. The cover assembly 200 is welded or is a uniform body. Poultry drinkers 202 are of different types and designs but generally have a tank 204 with a plurality of conical portions 208, and connected to the bottom of the tank 204 is a drinking pan or trough 210 that receives water from the tank 204. In one embodiment, the tank 204 is configured to contain 2, 3, 5, or 8 gallons of fluid. In an alternative embodiment, the tank is a Harris drinker. In another alternative embodiment, the tank 204 is configured to contain 3, 5, or 6 gallons of fluid. In the alternative, the tank 204 is a Brower tank that is configured to contain 4 or 7 gallons of fluid. In another embodiment, the tank 204 has a plurality of handles 212. The tank 204 can also be octagonal in shape.

The cover assembly 200 has one or more support members 214 having one or more feet 216. The feet 216 may be bent or shaped to configure to a variety of tanks 204, including but not limited to an octagonal tank as shown in FIG. 6A. In one embodiment, shown in FIG. 6B the feet 216 are shaped to engage the tank handles 212 to provide more stability. The feet 216 horizontally extend from a first end 220 to a first vertical portion 222 of the one or more support members 214. The support members 214 have the first vertical portion 222, a first horizontal portion 224, a second vertical portion 226, and a second horizontal portion 228. In one arrangement, portions 222, 224, 226 and 228 are arranged in a stair configuration as a solid rigid body. An elongated member 230 is centrally connected to and extends upwardly from the second horizontal section 228. As shown in FIG. 4B a support ring 232 is positioned between the support members 214 below the first horizontal portion 224 and has a diameter larger than the diameter of a tank lid 234. In one embodiment, shown in FIG. 6A, the tank lid 234 has one or more lid handles 236. The lid handles 236 may be positioned on the top of the tank lid 234. In one embodiment, the tank lid 234 is connected to a tank neck 238. Alternatively, the tank lid 234 is flush with the tank 204.

A gap 242 in the cover assembly 200 extends beneath the second horizontal portion 228 within the first vertical portion 222 that is configured to receive at least one of the lid handles 236. A pair of horizontally pinched hooks 244, that in one embodiment form a c-shape, is connected to the cover assembly 200 where the first horizontal portion 224 transitions into the second vertical portion 226. In one embodiment, the hooks are positioned on top of the tank lid 234 and engage the lid handles 236.

A cover member 246 is pivotally or tiltably connected to the elongated member 230. Preferably, the cover member 246 has a central opening 248 having a diameter larger than the diameter of the elongated member 230. In one embodiment, the cover member 246 tapers downwardly from the central opening 248 to an outer edge 250 of the cover member 246. Alternatively, the cover member 246 is arcuate and convex in relation to the tank 204. A nut 252 is connected to and extends upwardly from the elongated member 230. The nut 252 has at least one opening 254 that receives a ring 256.

In one arrangement, the cover member 246 engages the second horizontal portion 228 by threading the cover member 246 over the elongated member 230 through the central opening 248 of the cover member 246 and placing the nut 252 on the elongated member 230 above the cover member 246. The diameter of the nut 252 is greater than the diameter of the central opening 248. The amount of pivot or tilt of the cover member 246 in relation to the elongated member 230 is dependent upon the different of their respective diameters and the spacing between the nut 252 and the second horizontal portion 228.

In operation, once assembled, the user determines the amount of tilt buy twisting the ring 256 until the nut 252 is in the desired position to produce the desired amount of tilt. Once the tilt is set, when a bird lands on the cover member 246 to roost, the cover member 246 will tilt or pivot downward toward the tank causing the bird to slide off. From experience, it typically only takes one try before a bird learns not to attempt to roost on the cover.

Thus, a cover assembly has been disclosed that, at the very least, meets all the stated objectives and keeps contamination off the handle so the device is cleaner for the individual filling the drinker.

What is claimed is:

1. A cover assembly for a poultry drinker comprising: a pivotal cover member; a first support ring having a first diameter; a second support ring having a second diameter; a plurality of support members, each support member of the plurality of support members directly connected at one end to an adjacent support member and forming a peak, each support member of the plurality of support members having a second end directly connected to the first support ring, and a stepped intermediate portion of each support member of the plurality of support members directly connected to the second support ring; an elongated member extending upwardly from the peak and through the pivotal cover member; the first support ring is of a larger diameter than the second support ring; and the first and second support rings are positioned below the peak.

2. The cover assembly for a poultry drinker of claim 1 further comprising the plurality of support members having a first vertical portion, a first horizontal portion, a second horizontal portion, and an elongated angular portion.

3. The cover assembly for a poultry drinker of claim 1 further comprising a poultry drinker.

4. The cover assembly for a poultry drinker of claim 1 further comprising a nut connected to and extending upwardly from the elongated member.

5. The cover assembly for a poultry drinker of claim 1 wherein the cover member has a central aperture.

6. The cover assembly for a poultry drinker of claim 1 wherein the cover member is pivotally connected to the elongated member where the peak transitions into the elongated member.

7. The cover assembly for a poultry drinker of claim 1 wherein the cover member engages the peak by threading the cover member over the elongated member through a central aperture.

8. The cover assembly for a poultry drinker of claim 4 wherein the nut has a central opening that receives a ring.

9. The cover assembly for a poultry drinker of claim 4 wherein a pivotal angle of the cover member is determined by the distance between the nut and the peak.

10. The cover assembly for a poultry drinker of claim 1 wherein the first and second support rings engage varying sizes of conical portions of a tank.

11. A cover assembly for a poultry drinker comprising: a pivotal cover member; one or more support members; an elongated member extending from the one or more support members and through the pivotal cover member; a support ring directly connected to the one or more support members; and a plurality of hooks horizontally connected to a first horizontal portion of the one or more support members.

12. The cover assembly for a poultry drinker of claim 11 wherein the one or more support members have one or more feet, a first vertical portion, the first horizontal portion, a second vertical portion and a second horizontal portion.

13. The cover assembly for a poultry drinker of claim 12 wherein the cover member has a central opening that is threaded over the elongated member to tiltably engage the cover member in spaced relation with the elongated member and the second horizontal portion.

14. The cover assembly for a poultry drinker of claim 12 wherein the support ring is connected to and positioned between the one or more support members to form a gap between the first vertical portion and an opposing vertical portion, the first horizontal portion and an opposing horizontal portion, and the second vertical portion and a second opposing vertical portion.

15. The cover assembly for a poultry drinker of claim 11 further comprising a nut having an opening that receives a ring positioned on top of the elongated member.

16. The cover assembly for a poultry drinker of claim 12 wherein a pivotal angle of the cover member is formed by the distance between a nut and the second horizontal portion.

17. The cover assembly for a poultry drinker of claim 11 wherein the cover assembly engages a drinker having a tank with a tank lid such that the plurality of hooks are positioned near a tank lid handle.

18. A method for using a cover assembly for a poultry drinker comprising: assembling the cover assembly of claim 1 by placing the pivotal cover member over the elongated member through a central aperture and securing a nut and a ring on top of the elongated member; twisting the ring such that a distance between the nut and the cover member is altered in order to increase or decrease a tilted angle of the cover member; inserting a poultry drinker into one or more of the first and second support rings; and providing a bird to the poultry drinker such that when the bird roosts on the cover member, the bird will slide off of the cover member.

19. A method for using a cover assembly for a poultry drinker comprising: assembling the cover assembly of claim 11 by placing the pivotal cover member over the elongated member through a central aperture and securing a nut and a ring on top of the elongated member; twisting the ring such that a distance between the nut and the cover member is altered in order to increase or decrease a tilted angle of the cover member; inserting a poultry drinker into the support ring; and providing a bird to the poultry drinker such that when the bird roosts on the cover member, the bird will slide off of the cover member.

* * * * *